United States Patent
Da Conceição Rosa

(10) Patent No.: US 10,581,309 B2
(45) Date of Patent: Mar. 3, 2020

(54) SHORT-STROKE LINEAR MOTOR

(71) Applicant: ETEL S.A., Môtiers (CH)

(72) Inventor: André-Rafael Da Conceição Rosa, La Chaux-de-Fonds (CH)

(73) Assignee: ETEL S.A., Môtiers (CH)

( * ) Notice: Subject to any disclaimer, the term of this patent is extended or adjusted under 35 U.S.C. 154(b) by 637 days.

(21) Appl. No.: 15/153,215

(22) Filed: May 12, 2016

(65) Prior Publication Data

US 2016/0336843 A1    Nov. 17, 2016

(30) Foreign Application Priority Data

May 12, 2015    (EP) .................................... 15167268

(51) Int. Cl.
*H02K 41/03* (2006.01)
*H02K 41/035* (2006.01)

(52) U.S. Cl.
CPC ................ *H02K 41/0356* (2013.01)

(58) Field of Classification Search
CPC .... H02K 41/0356; H02K 41/031; F16F 15/03
USPC ...................................... 310/12.16
See application file for complete search history.

(56) References Cited

U.S. PATENT DOCUMENTS

| 5,723,917 | A | 3/1998 | Chitayat |
| 6,008,881 | A | 12/1999 | Warmerdam et al. |
| 6,861,771 | B2 * | 3/2005 | Zhai ........................ H01L 24/78 228/180.5 |
| 6,864,602 | B2 * | 3/2005 | Korenaga ............ H02K 41/031 310/12.24 |
| 7,663,270 | B2 | 2/2010 | Sadakane et al. |
| 7,800,258 | B2 | 9/2010 | Ito |
| 2002/0021050 | A1 | 2/2002 | Fujisawa et al. |
| 2004/0164470 | A1 | 8/2004 | Korenaga |
| 2006/0018645 | A1 | 1/2006 | Stavely |
| 2011/0127400 | A1 | 6/2011 | Kastelijn et al. |
| 2013/0311012 | A1 | 11/2013 | Black et al. |
| 2015/0331009 | A1 | 11/2015 | Galdos et al. |

FOREIGN PATENT DOCUMENTS

| CN | 102648126 A | 8/2012 |
| EP | 0916038 A1 | 5/1999 |
| EP | 1758231 A1 | 2/2007 |
| EP | 1873895 A1 | 1/2008 |
| EP | 2034595 A2 | 3/2009 |
| EP | 2075484 A1 | 7/2009 |
| EP | 2944966 A1 | 11/2015 |
| JP | H0874928 A | 3/1996 |
| JP | H9275069 A | 10/1997 |
| JP | 2006033857 A | 2/2006 |
| JP | 2006304545 A | 11/2006 |
| JP | 2008208859 A | 9/2008 |

* cited by examiner

Primary Examiner — Jianchun Qin
(74) Attorney, Agent, or Firm — Hunton Andrews Kurth LLP

(57) ABSTRACT

A linear motor for short strokes includes a primary section including a coil brace and coils disposed in it, as well as a secondary section that is movable relative to the primary section and has magnet holders with magnets placed on both sides of the coil brace. Spacers separate the magnet holders from each other such that the coil brace is movable between the two magnet holders. The spacers are guided through openings in the primary section.

22 Claims, 3 Drawing Sheets

SHORT-STROKE LINEAR MOTOR

CROSS-REFERENCE TO RELATED APPLICATIONS

The present application claims priority to Application No. 15167268.0, filed in the European Patent Office on May 12, 2015, which is expressly incorporated herein in its entirety by reference thereto.

FIELD OF THE INVENTION

The present invention relates to a short-stroke linear motor. For example, such linear motors having a limited operating range are used for the active damping of undesirable vibrations.

BACKGROUND INFORMATION

For the highly precise positioning of objects with the aid of a positioning device, it is conventional in semiconductor technology, for example, to use vibration-isolated platforms, because vibrations of the platform impressed from outside or excited during positioning reduce the accuracy of the positioning considerably.

The platform may be a massive granite stone having passive vibration damping, which may be realized with the aid of springs or pneumatic dampers, for example. For special requirements, in certain conventional systems, vibrations of the platform may be actively damped. To that end, on one hand, sensors are needed which are able to detect the undesirable vibrations, and on the other hand, actuators are needed that are able to counteract these vibrations. These actuators are located between the platform and the foundation.

European Published Patent Application No. 2 075 484 provides a good introduction into the topic of active vibration isolation. European Published Patent Application No. 2 944 966 describes an example for a suitable sensor.

Ironless linear motors present themselves as actuators. In such a linear motor, a primary section having flat coils extends in the air gap of a secondary section having magnets that are disposed on magnet holders on both sides of the primary section. Due to the magnets facing one another with opposite polarity, a high field strength is achieved in the air gap between the magnets. This makes it possible for the coils of the primary section located in the air gap to be implemented without an iron core, so that no attractive forces act on the primary section. The magnet holders are interconnected such that the primary section is able to move in a longitudinal or working direction of the linear motor, unhindered by the secondary section. This is often achieved with a U-shaped yoke, the magnets being disposed on the inner sides of the two limbs of the yoke. It is also conventional to join the magnet holders on both sides of the primary section to each other. Such a linear motor is described in European Published Patent Application No. 1 758 231, for example.

European Patent No. 0 916 038 describes a linear motor used for active vibration isolation. FIG. 2 of European Patent No. 0 916 038 shows a primary section having a planar coil brace and flat coils disposed in it, as well as a secondary section that is movable relative to the primary section and has magnet holders with magnets placed on both sides of the coil brace. Only the middle of the three flat coils shown is used to generate a force; the two outer coils are used to measure the vibrations to be damped. A U-shaped yoke separates the two magnet holders and embraces the primary section.

SUMMARY

Example embodiments of the present invention provide an especially compact short-stroke linear motor that is arranged structurally for the very special application in the area of active vibration damping.

According to an example embodiment of the present invention, a linear motor for short strokes includes a primary section including a coil brace and coils disposed in it, as well as a secondary section that is movable relative to the primary section and has magnet holders with magnets placed on both sides of the coil brace. Spacers separate the magnet holders from each other such that the coil brace is movable between the two magnet holders. For this purpose, the spacers are guided through openings in the primary section.

It is recognized that it is not necessary for the secondary section to wrap around the primary section if the structures used as spacers between the magnet holders are guided through openings in the primary section. Thus, an especially compact size of the linear motor is attained without reducing its performance. Stated differently, the arrangements described herein make it possible to accommodate a great deal of motor power output in a given volume. The restriction of the operating range of the linear motor thereby resulting is not a problem in the special application in a system for active vibration isolation.

Especially in the area of active vibration isolation, a more compact type of construction is an additional advantage, since each reduction in the dimensions of the actuator between the foundation and a platform decreases the vibrational tendency of the inverse pendulum, as one can observe in a spring-mounted platform.

Further features and aspects of example embodiments of the present invention are described in more detail below with reference to the appended Figures.

DETAILED DESCRIPTION

Figure 1:
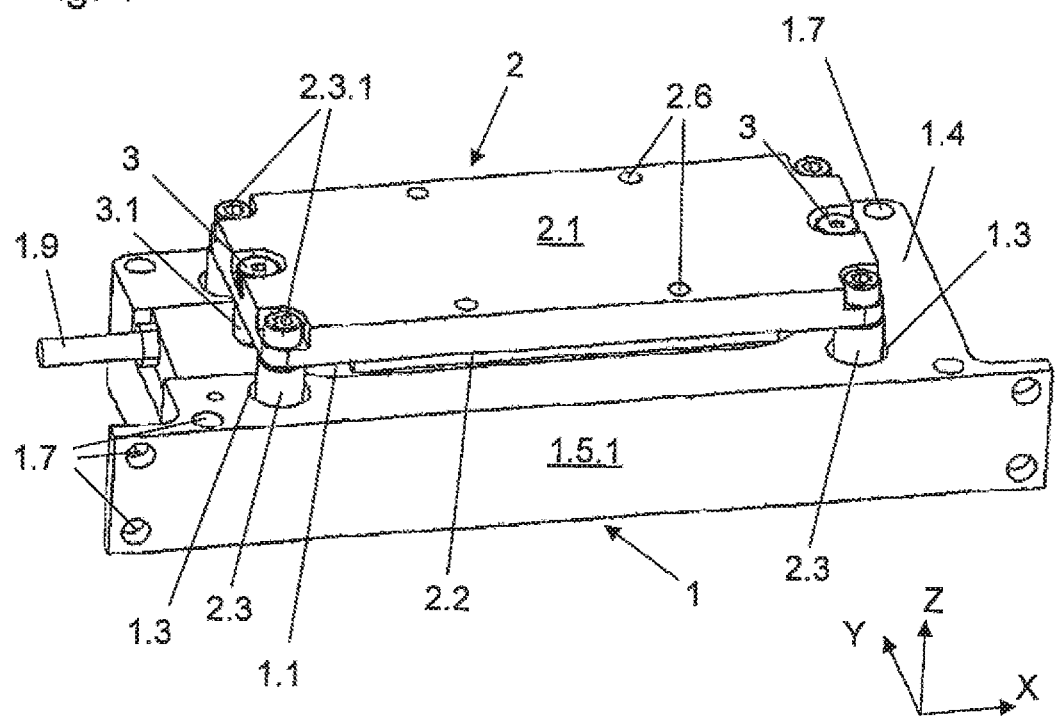
FIG. 1 illustrates a short-stroke linear motor according to an example embodiment of the present invention.
Figure 2:
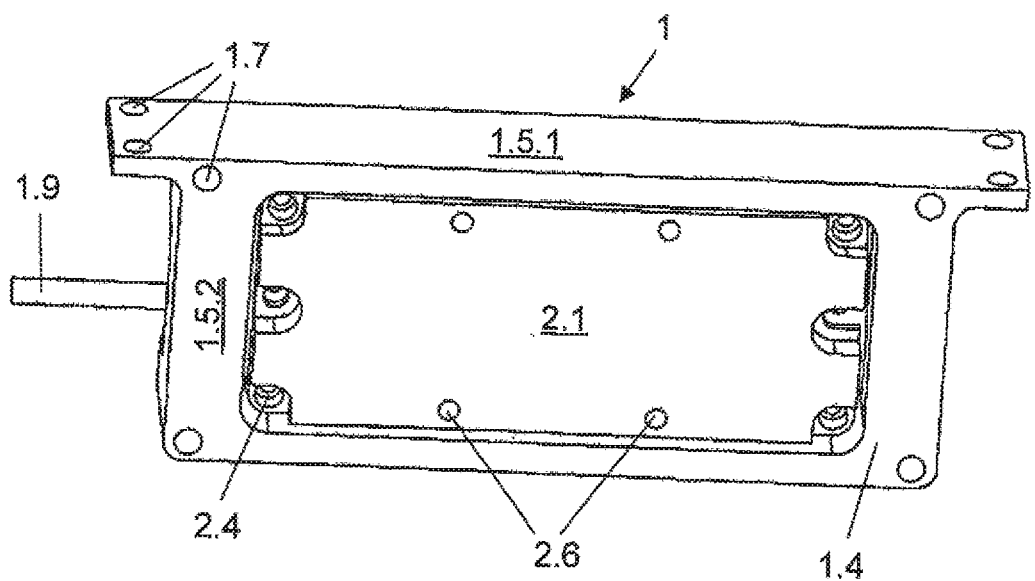
FIG. 2 is another view of the linear motor illustrated in FIG. 1.
Figure 3:
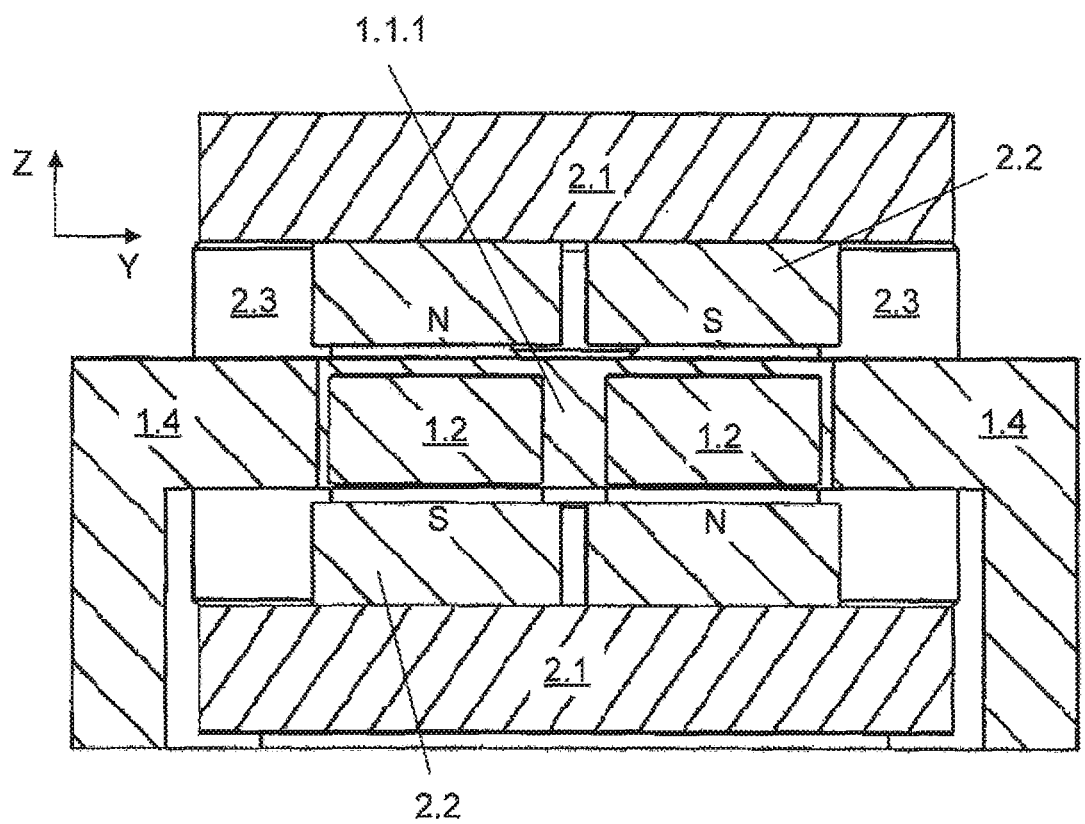
FIG. 3 is a first cross-sectional view of the linear motor illustrated in FIGS. 1 and 2.
Figure 4:
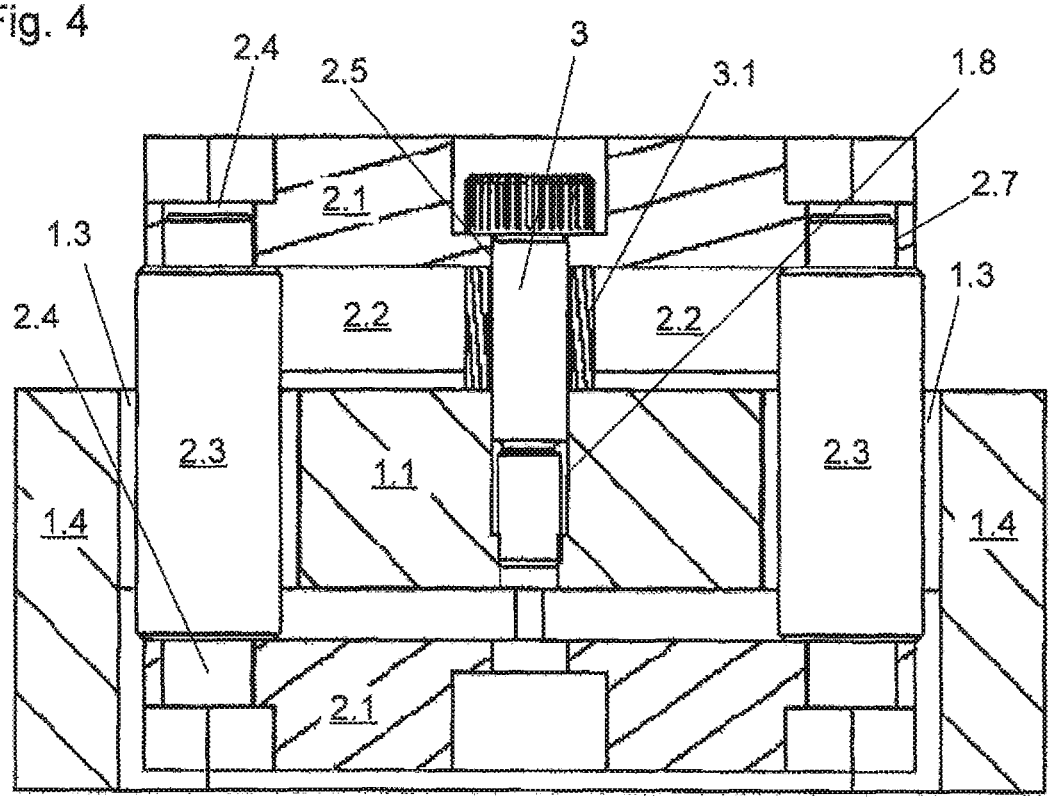
FIG. 4 is a second cross-sectional view of the linear motor illustrated in FIGS. 1 to 3.

FIGS. 1 and 2 illustrate a short-stroke linear motor according to an example embodiment of the present invention. A primary section 1 and a secondary section 2 of the linear motor are shown from two different viewing directions. FIGS. 3 and 4 are cross-sectional views through the linear motor.

Primary section 1 has a central planar area, which is a coil brace 1.1. The planar area extends in the X-Y plane, the linear motor representing a drive in the Y-direction. Disposed in this coil brace 1.1 are flat coils 1.2, which are illustrated in the sectional view of FIG. 3 because they are potted within coil brace 1.1 using a potting compound 1.1.1 (e.g., an epoxy resin), and protected with covers. Potting compound 1.1.1 dissipates heat that develops in coils 1.2, and at the same time, compensates for different expansion coefficients of coils 1.2, coil brace 1.1 and the covers mentioned.

The term "flat coils" denotes coils whose axial length is less or markedly less than their diameter. Usually in such a coil, many windings of wire are wound up side-by-side in the radial direction, but only one or a few layers of wire one upon the other in the axial direction.

Coil brace 1.1 is joined to a sturdy frame 1.4 (or both elements are formed in one piece), and is surrounded by this frame 1.4. Frame 1.4 has mounting surfaces 1.5.1 and 1.5.2 having mounting bores 1.7 that are used to secure primary section 1 to an application. As two differently oriented mounting surfaces 1.5.1 and 1.5.2, respectively, are available, different mounting positions may be selected to thus be able to handle different working directions. Frame 1.4 and planar area 1.1 are formed of a non-ferromagnetic (e.g., ironless) material such as aluminum, for instance. Provided in frame 1.4 is a cutout through which a supply lead 1.9 extends, via which coils 1.2 are supplied with current.

Secondary section 2 has two planar magnet holders 2.1, which are formed as ferromagnetic plates and are disposed on both sides of coil brace 1.1. As illustrated in FIG. 1, upper magnet holder 2.1 is located outside of primary section 1, and as illustrated in FIG. 2, lower magnet holder 2.1 is disposed within frame 1.4. Frame 1.4 is considerably wider in the Z-direction than coil brace 1.1, so that lower magnet holder 2.1 does not protrude beyond frame 1.4 in the Z-direction.

Both magnet holders 2.1 bear magnets 2.2 on their side facing coil brace 1.1. Magnets 2.2 are placed in working direction Y with alternating polarity on magnet holders 2.1, while different magnet poles N, S in each case lie opposite each other on both sides of coil brace 1.1. The placement of coils 1.2 and magnets 2.2 is illustrated in FIG. 3, which is a cross-sectional view through this area of the linear motor.

Since the linear motor is arranged as an ironless motor, magnets 2.2 exert no attractive forces on primary section 1. However, the two magnet holders 2.1 exert a mutual attraction. In order to keep the two magnet holders 2.1 at a distance from one another, and to provide an air gap between magnets 2.2 in which primary section 1 is able to move relative to secondary section 2, four spacers 2.3 are joined in each case to both magnet holders 2.1 with the aid of screws 2.3.1. Bores 2.4 for receiving these screws 2.3.1 are illustrated in FIGS. 2 and 4, which, for clarity, do not show the screws 2.3.1.

FIG. 4 is a cross-sectional view through the area of spacers 2.3. Unlike in the case of customary linear motors of this type, spacers 2.3 are not guided laterally past primary section 1, but rather extend through openings 1.3 in primary section 1. This considerably limits the possible range of motion of the linear motor both in its working direction Y and perpendicular to that in the X-direction. However, since the linear motor only has to permit very small excursions for the active damping of vibrations, this is not disadvantageous. On the other hand, this placement of spacers 2.3 provides certain advantages, because it allows an especially compact configuration of the linear motor that makes do without structures embracing primary section 1, as are conventional. In addition, openings 1.3 and spacers 2.3 form limit stops in the X-direction and Y-direction which, if need be, for instance, in the event forces impressed from outside are too great, prevent too large a relative shift between the moving masses. If both openings 1.3 in primary section 1 and spacers 2.3 of secondary section 2 have a circular cross-section, then the difference between the two diameters determines the range of motion available in the X-direction and Y-direction. In the Z-direction, the air gap between magnets 2.2 limits the freedom of motion of primary section 1 or of coil brace 1.1 relative to secondary section 2.

In order not to disturb the magnetic fields of magnets 2.2, spacers 2.3, which are situated especially close to magnets 2.2 due to the compact construction of the linear motor, are produced from a non-magnetic material such as high-grade steel. Because of the resultant missing return path of the magnetic field from one magnet holder 2.1 to the other, it is advisable on each of magnet holders 2.1 to provide an even number of magnets that in each case are placed side-by-side with alternating polarity, so that at some distance from a magnet holder 2.1, the magnetic field vanishes. In this context, facing poles of two magnets 2.2 are different, so that a high modulation of the field strength results within the air gap of secondary section 2. Particularly high forces may thus be attained by the energizing of coils 1.2 in primary section 1.

In the installed state, the relative position between primary section 1 and secondary section 2 is defined by the specific application. However, so long as the linear motor is not yet installed, a transport lock 3 may be provided, the form of which is illustrated in FIG. 4. The transport lock includes a screw 3, which is guided through a bore 2.5 in upper magnet holder 2.1. At its end, this screw 3 has a thread by which it is screwed into a corresponding thread in bore 1.8 in primary section 1. The diameter of screw 3 and the diameter of bore 2.5 in magnet holder 2.1 correspond to one another. Consequently, the relative position in the X-Y direction between primary section 1 and secondary section 2 is fixed, because the two magnet holders 2.1 are joined firmly to each other via spacers 2.3.

The relative position of primary section 1 and secondary section 2 is fixed in the Z-direction in that when tightening screw 3, a sleeve 3.1, pushed via screw 3, is clamped between primary section 1 and secondary section 2. When transport lock 3 is removed, sleeve 3.1 may also be taken out of the gap between primary section 1 and secondary section 2.

The relative position of primary section 1 and secondary section 2 is determined in all six degrees of freedom by the two screws 3 shown in FIG. 1.

To achieve precise alignment of spacers 2.3 relative to each other, spacers 2.3 have guide surfaces 2.7 that correspond to matching surfaces of bores 2.4 in upper magnet holder 2.1. For cost reasons, only one such guide surface 2.7 is provided on each spacer 2.3, since with that, the alignment of spacers 2.3 relative to each other is already fixed. The two magnet holders 2.1 are aligned relative to each other in the X-Y direction with the aid of a mounting device that relates to bores 2.5 for transport lock 3.

Figure 5:
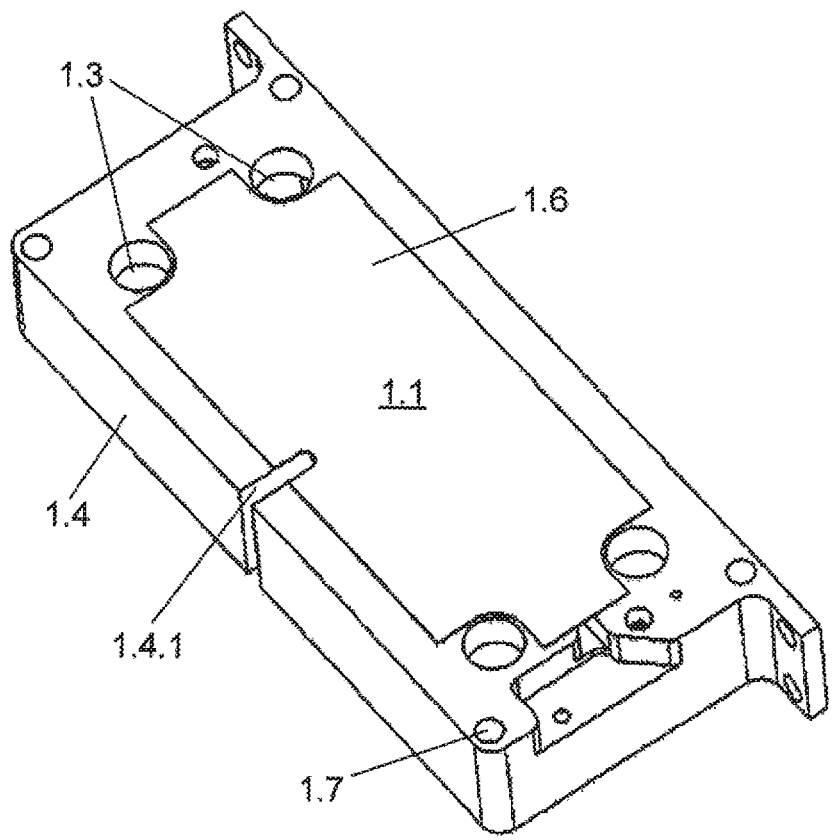
FIG. 5 illustrates a modified primary section of a short-stroke linear motor.

FIG. 5 illustrates a linear motor according to another example embodiment of the present invention. The features of this linear motor may be combined with the linear motor described above and illustrated in FIGS. 1 to 4.

As mentioned above, primary section 1 is produced from a non-ferromagnetic material, e.g., using a milling process. In so doing, electrically conductive materials such as aluminum or copper are preferred because of their good thermal conductivity for removing the heat generated in coils 1.2. However, due to changing currents in coils 1.2, eddy currents are produced in them which diminish the dynamic performance of the linear motor. In order to avoid or at least to reduce such eddy currents, in this exemplary embodiment, an interruption 1.4.1 is provided in frame 1.4 of primary section 1.

The especially sturdy frame 1.4 is otherwise well-suited to conduct heat, generated in coils 1.2, to large-area mounting surfaces 1.5.1 and 1.5.2, respectively, which are usually joined to a very massive steel body used as heat sink. In order to promote the transport of heat from coils 1.2 to frame 1.4, coils 1.2 are not only potted as usual in coil brace 1.1 with a resin 1.1.1 having good thermal conductivity, but in this exemplary embodiment, are also covered with carbon-fiber plates 1.6 on both sides of planar coils 1.2. Such carbon-fiber plates 1.6 behave in electrically neutral (no eddy currents) and magnetically neutral (no forces due to the prevailing magnetic field) fashion, in marked contrast to covers made of aluminum, copper, or even iron. However, carbon-fiber plates 1.6 conduct the waste heat from coils 1.2 well to frame 1.4, and also offer good mechanical protection.

Primary section 1 may have a single coil 1.2 and two magnets 2.2 on each magnet holder 2.1. In order to increase the available power of the linear motor, the extension of the motor may be increased in the Y-direction, so as then to install additional coils 1.2 and magnets 2.2. In so doing, the number of coils 1.2 may in each case be increased by one, that of magnets 2.2 by in each instance two (per magnet holder 2.1).

Figure 6:
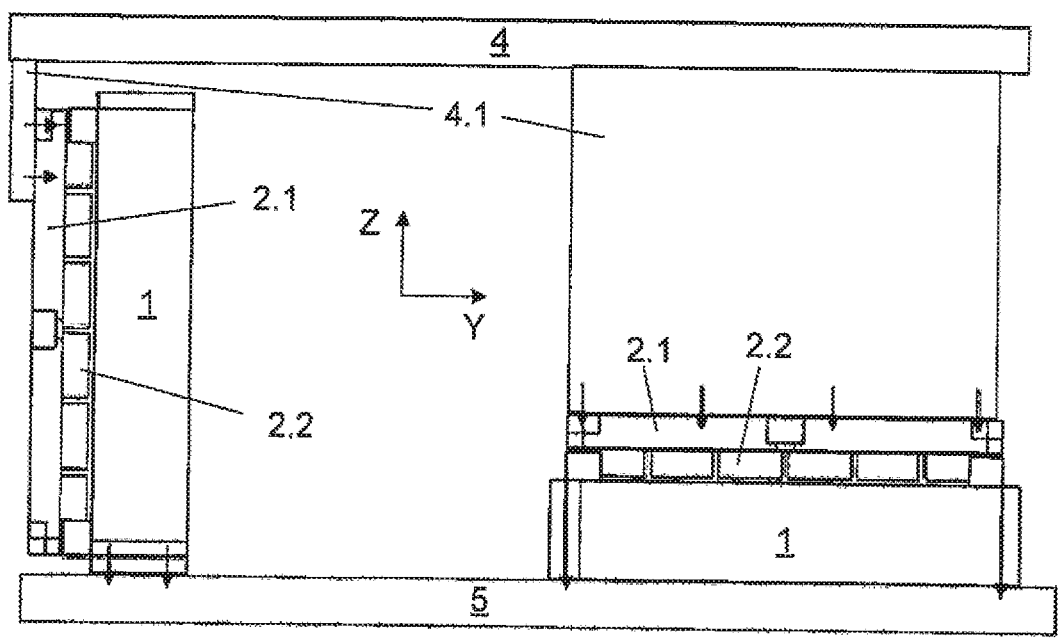
FIG. 6 illustrates a platform actively vibrationally-damped with the aid of a linear motor.

FIG. 6 schematically illustrates that the linear motor may be installed in different positions and therefore for vibration damping in different directions. FIG. 6 illustrates two linear motors having six magnets 2.2 on each magnet holder 2.1 (and therefore 3 flat coils 1.2 in primary section 1), which are used to damp vibrations in the Y-direction and Z-direction, respectively. Both are situated between a granite 4 used as platform for a positioning device, and a base 5. In this context, primary section 1 is joined in each case directly to base 5 (the arrows in FIG. 6 indicate screw connections), different mounting surfaces 1.5.1 and 1.5.2, respectively, being used in each instance. The waste heat of primary section 1 is thus dissipated toward base 5, so that granite 4 as a support for the positioning device remains cool. Secondary section 2 is joined in each case to granite 4 via a matching mechanical interface 4.1. Mounting bores 1.7 of primary section 1 needed for the mounting and mounting bores 2.6 in magnet holders 2.1 of secondary section 2 are illustrated in the previous Figures.

In order to reduce costs, both magnet holders 2.1 are made completely identical, even if individual details such as mounting bores 2.6, for instance, are not even necessary in one of the two positions.

What is claimed is:

1. A linear motor for short strokes, comprising:
a primary section including a planar coil brace and at least one coil provided in the coil brace; and
a secondary section movable relative to the primary section and including planar magnet holders having magnets arranged on both sides of the coil brace, the magnet holders being separated from each other by spacers extending perpendicular to the plane of the coil brace and of the magnet holders so that the coil brace is movable between the two magnet holders;
wherein the spacers are arranged through openings in the primary section.

2. The linear motor according to claim 1, wherein the openings are adapted to limit mobility of the primary section relative to the secondary section in two spatial directions.

3. The linear motor according to claim 2, wherein a spacing of the magnet holders or of the magnets disposed on the magnet holders is adapted to limit mobility of the primary section relative to the secondary section in a third spatial direction.

4. The linear motor according to claim 1, wherein a spacing of the magnet holders or of the magnets disposed on the magnet holders is adapted to limit mobility of the primary section relative to the secondary section in a spatial direction.

5. The linear motor according to claim 1, wherein the spacers are formed of a non-ferromagnetic material and/or a high-grade steel.

6. The linear motor according to claim 5, wherein an even number of magnets is provided on each of the magnet holders.

7. The linear motor according to claim 1, wherein the primary section includes a frame that wraps around the coil brace.

8. The linear motor according to claim 7, wherein the frame includes two mounting surfaces of different orientation, each mounting surface including mounting bores adapted to secure the primary section to a component.

9. The linear motor according to claim 7, wherein the frame is formed of an electroconductive material and is interrupted at a location.

10. The linear motor according to claim 1, wherein the coil is arranged in openings in the coil brace.

11. The linear motor according to claim 10, wherein the coil is potted with a potting compound and/or is covered with carbon-fiber plates.

12. The linear motor according to claim 11, wherein the primary section includes a frame that wraps around the coil brace, and the coil is bound thermally to the frame by the potting compound and/or the carbon-fiber plates.

13. The linear motor according to claim 1, wherein the primary section and the secondary section are fixable in position relative to each other by a transport lock.

14. The linear motor according to claim 1, wherein the linear motor is arranged as an ironless linear motor.

15. The linear motor according to claim 1, wherein the linear motor is included in a system, the system including a base, a vibration-isolated platform of a positioning device, and a plurality of short-stroke linear motors, each short-stroke linear motor adapted to actively damp vibrations in a respective direction, the linear motor arranged as one of the plurality of short-stroke linear motors and arranged between the platform and the base.

16. A system, comprising:
a vibration-isolated platform of a positioning device;
a base; and
at least one short-stroke linear motor adapted to actively damp vibrations, arranged between the platform and the base, including;
a primary section including a planar coil brace and at least one coil provided in the coil brace; and
a secondary section movable relative to the primary section and including planar magnet holders having magnets arranged on both sides of the coil brace, the magnet holders being separated from each other by spacers extending perpendicular to the plane of the coil brace and of the magnet holders so that the coil brace is movable between the two magnet holders, the spacers are arranged through openings in the primary section, the secondary section being movable relative to the primary section in a direction perpendicular to the spacers.

17. The system according to claim 16, wherein the primary section is joined to the base, and the secondary section is joined to the platform.

18. The system according to claim 17, wherein the primary section is adapted to dissipate waste heat toward the base.

19. The system according to claim 16, wherein the primary section is joined to the platform, and the secondary section is joined to the base.

20. The system according to claim 16, wherein the system includes a plurality of short-stroke linear motors, each short-stroke linear motor adapted to actively damp vibrations in a respective direction.

21. The system according to claim 16, wherein the system includes a plurality of short-stroke linear motors, a first short-stroke motor adapted to actively damp vibrations in a first direction, a second short-stroke motor adapted to actively damp vibrations in a second direction orthogonal to the first direction.

22. The system according to claim 16, wherein:
(a) the primary section includes a frame that wraps around the coil brace; and/or,
(b) the frame includes two mounting surfaces of different orientation, each mounting surface including mounting bores adapted to secure the primary section to a component; and/or
(c) the coil is arranged in openings in the coil brace, and the coil is potted with a potting compound and/or is covered with carbon-fiber plates; and/or
(d) the primary section includes a frame that wraps around the coil brace, and the coil is bound thermally to the frame by the potting compound and/or the carbon-fiber plates.

* * * * *